(12) United States Patent
Bennison (10) Patent No.: US 9,647,843 B2
(45) Date of Patent: May 9, 2017

(54) SYSTEM AND METHOD FOR SECURE DATABASE QUERIES

(71) Applicant: Northrop Grumman Systems Corporation, Falls Church, VA (US)

(72) Inventor: James E. Bennison, Oakton, VA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 15/069,616

(22) Filed: Mar. 14, 2016

(65) Prior Publication Data

US 2016/0197728 A1 Jul. 7, 2016

Related U.S. Application Data

(63) Continuation of application No. 14/207,418, filed on Mar. 12, 2014, now Pat. No. 9,286,488.

(60) Provisional application No. 61/780,523, filed on Mar. 13, 2013.

(51) Int. Cl.
*G06F 21/00* (2013.01)
*H04L 9/32* (2006.01)
*G06F 21/62* (2013.01)
*G06F 21/72* (2013.01)
*G06F 17/30* (2006.01)

(52) U.S. Cl.
CPC ...... *H04L 9/3236* (2013.01); *G06F 17/30097* (2013.01); *G06F 21/6227* (2013.01); *G06F 21/72* (2013.01)

(58) Field of Classification Search
CPC .............................. G06F 21/6227; G06F 21/72
See application file for complete search history.

(56) References Cited

U.S. PATENT DOCUMENTS

| 8,843,997 B1 | 9/2014 | Hare |
| 2007/0157262 A1 | 7/2007 | Ramaswamy et al. |
| 2008/0171598 A1 | 7/2008 | Deng |
| 2008/0183656 A1 | 7/2008 | Perng et al. |
| 2010/0287151 A1 | 11/2010 | Mustonen |

(Continued)

OTHER PUBLICATIONS

Sion, Radu; "Query Execution Assurance for Outsourced Databases"; http://vldb.org/archives/wesite/2005/program/paper/thu/p601-sion.pdf; pp. 601-612; 2005.

*Primary Examiner* — Mahfuzur Rahman
(74) *Attorney, Agent, or Firm* — Sean S. Wooden; Andrews Kurth Kenyon LLP (57) ABSTRACT

Disclosed are a system and method of performing secure computations on a protected database. Embodiments of the method provide, in a secure processor, a database of cryptographically hashed values based on a database of cleartext values, receive a cryptographically hashed query value as input into the secure processor wherein the query value is a hash of a cleartext value that corresponds to a cleartext query, perform a comparison operation within the secure processor to determine the presence of the hashed query value within the database of cryptographically hashed values and provide the results of the comparison operation to an external interface of the secure processor, wherein the contents of the database of cryptographically hashed values and the comparison operations are encapsulated within the secure processor and unexposed externally therefrom.

16 Claims, 4 Drawing Sheets

(56) References Cited

U.S. PATENT DOCUMENTS

2011/0145593 A1    6/2011   Auradkar et al.
2013/0262863 A1    10/2013   Yoshino et al.

SYSTEM AND METHOD FOR SECURE DATABASE QUERIES

CROSS REFERENCE TO RELATED APPLICATION(S)

This application claims priority from U.S. Provisional Patent Application. No. 61/780,523, filed on Mar. 13, 2013, which is hereby incorporated herein by reference in its entirety.

BACKGROUND

Private sector unclassified networks are exposed and accessible to adversaries. Various Government and civilian networks consistently face attacks and threats via the Internet. For example, Department of Defense (DoD) and Defense Industrial Base (DIB) unclassified networks, commercial banking institutions, large businesses, critical infrastructure facilities and many other organizations face a range of Internet threats on a daily basis, including advanced persistent threats (APT) that can evade commercially available security tools and defeat generic security practices. APTs usually refer to organized groups with the capability, resources and the intent to persistently and effectively target a specific entity. The term APT is commonly used to refer to cyber threats, in particular that of sophisticated Internet-enabled adversaries using a variety of knowledge gathering techniques to access sensitive information. Other recognized APT attack vectors include infected media, supply chain compromise, and social engineering. Individuals, such as an individual hacker, are not usually referred to as an APT as they rarely have the resources to be both advanced and persistent even if they are intent on gaining access to, or attacking, a specific target.

In this environment, where no tool or best practice can totally solve the problem, it would be very valuable to have available a qualified set of accurate cyber threat indicators that can be used to identify, screen, filter and thwart cyber threats against an enterprise. Such cyber threat indicators, in and of themselves, are very sensitive and must be protected by an organization in order to prevent any exposure or leakage to unintended users or adversaries lest they use that knowledge to develop countermeasures or change their techniques to evade detection. In addition, it would be extremely beneficial if the set of cyber threat indicators could be shared among selected organizations so they too can achieve a high level of cyber protection, but in a way that safeguards the secrecy of the indicators. This method of securely sharing sensitive sets of cyber threat indicators while not exposing their content is a significant step forward in protecting critical infrastructure and other vital assets in cyberspace.

In addition to cyber threats, physical terror threats to domestic security exist as a result of the movement across borders of dangerous individuals, e.g., terrorists, and substances, e.g., explosives or biological agents that the government needs to detect. Watch lists e.g., "no fly" lists, terrorist lists or banned substance lists, have been developed for these threats by various international and governmental entities. However, such entities lack a secure way to share and use this sensitive data at the point of need, e.g., airports, border crossings or sea-ports without the risk of exposure or leakage to adversaries.

Current solutions to the above problems typically involve expensive physical, personnel and operational security which inhibits fast or wide deployment and provides inferior security and performance. In certain secure environments, existing security controls consist primarily of sensitive compartmented information facilities ("SCIFs"), personnel with authorized security clearances, and management policies and operational processes and procedures. A SCIF is an enclosed area within a building that is used to process sensitive compartmented information which is required to be handled within formal access control systems. Some entire buildings are SCIFs where all but the front foyer is secure. Access to SCIFs is limited, and all of the activity and conversation inside is presumed restricted from public disclosure. A SCIF can also be located in an air, ground or maritime vehicle, or can be established on a temporary basis at a specific site. Implementing and maintaining SCIFs, and these other security measures, is expensive, inefficient and not sufficiently effective. Current security controls and solutions suffer from numerous other disadvantages as well.

There is a present need to perform searches and queries against a database containing sensitive information while maintaining the confidentiality or secrecy of the information contained within the database. There is also a need to protect the query of such searches from being revealed to anyone other than the intended user of the system. There is a need to perform database operations on data that resides in an open, untrusted network environment such as the Internet or in architectures utilizing Cloud computing resources. In these situations the owner of the database and the queries may find it advantageous to utilize networking and computing resources for cost and performance efficiencies; however, these resources are not necessarily under the data owner's control. In these cases the desired privacy, security or confidentiality of the data cannot be guaranteed due to the unknown and uncontrolled accessibility inherent to distributed computing resources on open, untrusted networks.

SUMMARY

An advantage of embodiments described herein is that they overcome disadvantages of the prior art described above. Embodiments enable the performance of searches and queries against a database containing sensitive information while maintaining the confidentiality or secrecy of the information contained within the database. Embodiments protect the query from being revealed to anyone other than the intended user of the system.

These and other advantages described herein are achieved by a method of performing secure computations on a protected database that provides, in a secure processor, a database of cryptographically hashed values based on a database of cleartext values, receives a cryptographically hashed query value as input into the secure processor wherein the query value is a hash of a cleartext value that corresponds to a cleartext query, performs a comparison operation within the secure processor to determine the presence of the hashed query value within the database of cryptographically hashed values and provides the results of the comparison operation to an external interface of the secure processor, wherein the contents of the database of cryptographically hashed values and the comparison operations are encapsulated within the secure processor and unexposed externally therefrom.

These and other advantages described herein are achieved by a method of performing secure computations on a protected database that transforms a first database of cleartext values into a second database of cryptographically hashed values wherein the elements of the first database have associated hashed elements in the second database, encrypts the contents of the second database and formats the data into an encrypted datastream configured for transmission to a secure processor, provides the encrypted datastream to the input of the secure processor, decrypts the encrypted datastream within the secure processor, stores the results of the decryption in a third database located within the secure processor thereby producing a replica of the second database of cryptographically hashed values within the secure processor, receives a cryptographically hashed query value as input into the secure processor wherein the query value is a hash of a cleartext value that corresponds to a cleartext query, performs a comparison operation within the secure processor to determine the presence of the hashed query value within the third database and provides the results of the comparison operation to an external interface of the secure processor, in which the contents of the third database and the comparison operations are encapsulated within the secure processor and unexposed externally therefrom.

These and other advantages described herein are achieved by a tangible computer readable medium that includes instructions for performing secure computations on a protected database by transforming a first database of cleartext values into a second database of cryptographically hashed values wherein the elements of the first database have associated hashed elements in the second database, encrypting the contents of the second database and formatting the data into an encrypted datastream configured for transmission to a secure processor, providing the encrypted datastream to the input of the secure processor, decrypting the encrypted datastream within the secure processor, storing the results of the decryption in a third database located within the secure processor thereby producing a replica of the second database of cryptographically hashed values within the secure processor, receiving a cryptographically hashed query value as input into the secure processor in which the query value is a hash of a cleartext value that corresponds to a cleartext query, performing a comparison operation within the secure processor to determine the presence of the hashed query value within the third database and providing the results of the comparison operation to an external interface of the secure processor, wherein the contents of the third database and the comparison operations are encapsulated within the secure processor and unexposed externally therefrom.

These and other advantages described herein are achieved by a system for performing secure computations on a protected database that includes a first secure processor that includes a memory and a processor, in which the memory includes instructions, executed by the processor, for transforming a first database of cleartext values into a second database of cryptographically hashed values in which the elements of the first database have associated hashed elements in the second database, encrypting the contents of the second database and formatting the data into an encrypted datastream configured for transmission to a second secure processor and providing the encrypted datastream to the input of the second secure processor.

DETAILED DESCRIPTION

Described herein are embodiments of a system and method for secure database queries. Embodiments create a proven, verifiable technical platform to provide a secure way (in transit, in use, and at rest) for organizations to share sensitive data, including, e.g., cyber threat indicators or terror watch list subjects with government, industry, critical infrastructure and other partners.

An objective of embodiments is to enable the provisioning of a database with sensitive information while maintaining the confidentiality or secrecy of the information during the provisioning process and when residing within the database. Another objective of embodiments is to perform searches and queries against a database containing sensitive information while maintaining the confidentiality or secrecy of the information contained within the database. Another objective is to protect the query from being revealed to anyone other than the intended user of the system. As noted above, there is a need to perform database operations on data that resides in an open, untrusted network environment such as the Internet or in architectures utilizing Cloud computing resources. In these situations the owner of the database and the queries may find it advantageous to utilize networking and computing resources for cost and performance efficiencies. Embodiments meet this need and enable the advantageous use of networking and computing resources.

Embodiments provide a system and method for confidentially and securely performing database operations that use novel combinations of a secure processor for performing computational operations, data obfuscation, data compression and data protection methods. In one embodiment, the data obfuscation and compression are accomplished by utilizing one-way hash functions. One-way hash functions are data transformation operations well known to those skilled in the art of information technologies. Data protection may be accomplished by using encryption and decryption techniques that are also well known to those skilled in the art of data security. Examples of well-known encryption techniques include the Advanced Encryption Standard (AES), Elliptical Curve Cryptography and myriad other ciphers and algorithms.

In a typical use case, a non-secure network connected system is considered to be not secure and not resistant to tamper. A secure processor is a secure, encapsulated processor that protects the program execution and its memory contents from being exposed externally to the encapsulation. It may comprise an input interface that receives encrypted data and a decryption processor that converts the received encrypted data into corresponding unencrypted data within the encapsulation. In one embodiment, the unencrypted data of the invention includes hashed data values corresponding to original sensitive information and where the secure processor includes a computational processor that performs a sequence of operations described below on the hashed data, a computational processor for converting the results of the sequence of operations into data results that are related to database queries, and an output interface for passing the data results from the encapsulated processor back to the non-secure network connected system for subsequent data processing. The encapsulation of the secure processor may embed the processor in packaging with multiple physical security measures and typically includes anti-tamper protection for preventing the internal operations and the hashed data to be accessible externally. Secure processors may include a variety of security measures, including tamper-detecting and tamper evident containment, conductive shield layers in the microprocessor chip to prevent internal signal reading, controlled execution to prevent timing delays from revealing information, automatic zeroization of secret information in event of tampering, chain of trust boot-loader which authenticates an operating system before loading, chain of trust operating system which authenticates application software before loading, and hardware-based capability registers, implementing a one-way privilege separation model, among others. Several variants of secure processor implementations exist and are commercially available including custom ASICs, anti-tamper FPGAs, embedded processors, tamper-resistant microprocessors, etc. and have been used in applications such as smartcards, cryptography hardware, digital rights management (DRM) devices, among others. Secure processors are well known to those skilled in the art of digital processor design and the examples and features described herein are used only as examples.

Embodiments provide an enhancement to the above secure processor configuration that includes a set of high assurance software methods that can perform queries on a database of hashed values representing sensitive or classified data and return only a 'match' or 'no-match' (true/false) result without revealing the contents of the database to the inquirer. The system uses cryptographic hashes (which are a one way, non-reversible transform of data producing digests of fixed length, as an example but not limited to the well-known hash functions including, e.g., MD4, MD5, SHA-1, SHA-2 and SHA-3) to compare data on two different systems: the non-secure network connected processor and the secure processor.

Advantages of embodiments described herein include the ability to distribute sensitive database information that would heretofore be contained and processed only within trusted secure environments by privileged users. While it is well known that many encryption methods exist for securely distributing and storing sensitive information on open, untrusted systems, the challenge is how the encrypted data can be operated on, without exposing or leaking the sensitive information. To achieve this, various methods perform isolated encryptions of each information field or data record independently of the others. These methods typically perform searches on the encrypted databases by identically encrypting a cleartext query, thereby producing an encrypted representation that can be searched for and matched. A significant shortcoming of this method is that the encrypted data records are deterministic, i.e., the same cleartext data produces the same encrypted data for each instance and there is a one-for-one match between the two. If the encrypted database becomes exposed, it is possible to perform well known cryptanalysis operations on the encrypted records which makes the database vulnerable to decryption and compromise.

Embodiments described herein overcome these deficiencies by first ensuring that the sensitive cleartext information and its corresponding cryptographically hashed values are not invertible pairs. The hashed values are one-way functions which cannot be transformed back to cleartext hence a one-for-one mapping does not occur thereby preventing the recovery of cleartext values by decrypting the hashed data. An additional advantage of embodiments described herein is that the entire database of hashed values is encapsulated within the secure processor thereby protecting it from outside exposure. The only transaction that occurs between a user and the secure processor is a query input and a match/no-match output. By ensuring the secrecy of the database of hashed values within the secure processor cryptanalysis as suggested above is not feasible. Embodiments of the method of provisioning the database with sensitive information described herein, originating only from a secure environment, also overcome deficiencies in the prior art. Typically a host server transfers a database over a network or through a physical interface. Even if the database is encrypted, these methods result in the exposure of the entire encrypted database, which for the reasons described above, make it vulnerable to cryptanalysis and reverse engineering. The present invention never exposes the database of hashed values which further protects it from potential compromise.

Another objective of embodiments described herein is to perform the aforementioned database operations at security levels that are compatible with government security requirements. To further meet these objectives, the secure processor used may include additional properties such as physical encapsulation of the data processing components and anti-tamper provisions for preventing the exposure of the internal data and database operations from being revealed external to the encapsulation.

Figure 1:
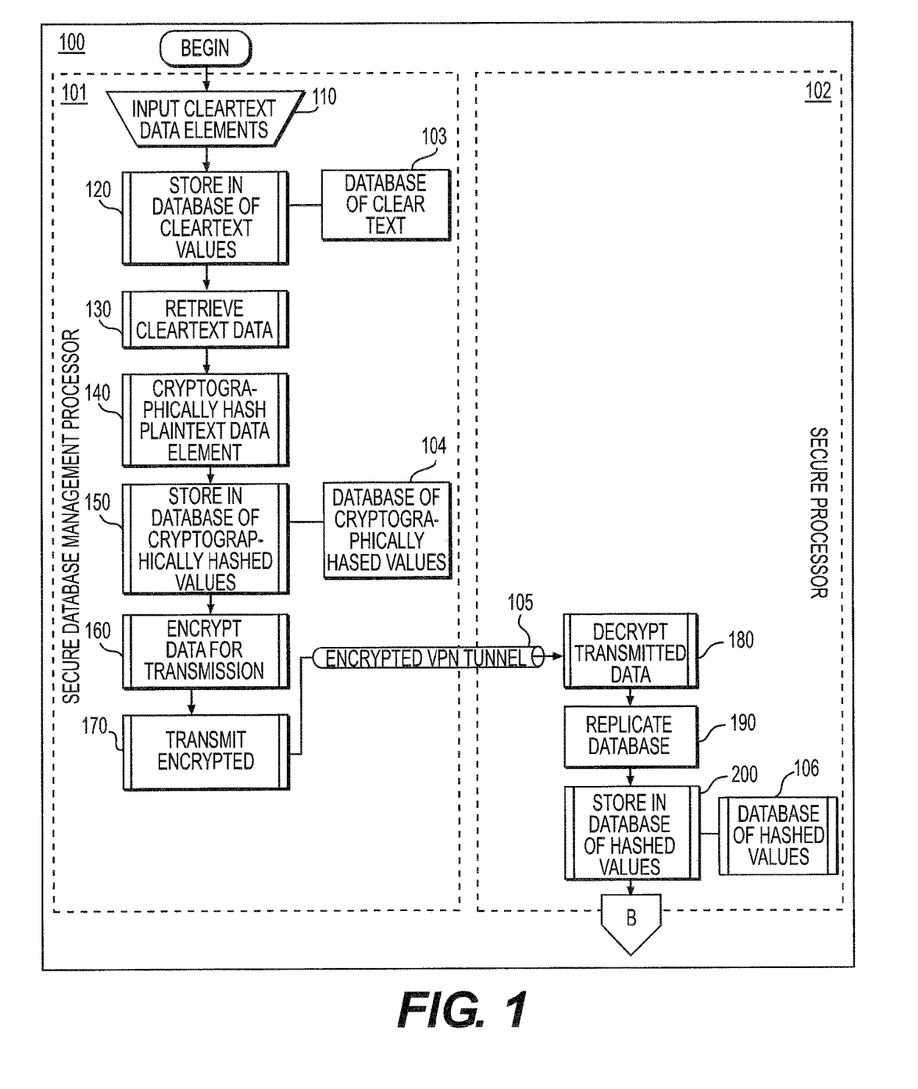
FIG. 1 is a flowchart illustrating an embodiment of a process that enables provisioning of a secure database of sensitive data.

With reference now to FIG. 1, shown is an embodiment of a method 100 that enables provisioning of a secure database of sensitive data. The method 100 provisions the hashing of database information for storage in a secure processor. The method 100 shown uses a secure database management processor 101 to perform the hashing operation. In the example embodiment shown, a method 100 is described herein that includes hashing the database information and uploading a hashed representation of the database entries for storage within the secure processor 102. The hashing operation has the effect of augmenting the encryption and anti-tamper features of the secure processor 102, making it computationally infeasible to recover the plaintext of the sensitive data. These attributes and advantages are further described herein.

As shown, a hashed database provisioning process flow of method 100 begins with inputting of clear text or plain text data elements, block 110. This may be performed using a secure database management processor 101. The clear text data elements may be stored in a database 103 of clear text values, block 120. Processor 101 retrieves the clear text data elements from the database, block 130, and cryptographically hashes the clear text data, block 140. Processor 101 stores the cryptographically hashed values generated from cryptographically hashing the clear text data in a database 104 of cryptographically hashed values, block 150. The database 104 of cryptographically hashed values may be further encrypted for transmission, block 160 and then transmitted, block 170, e.g., using an encrypted virtual private network (VPN) tunnel 105 to a secure processor 102. Secure processor 102 decrypts the encrypted cryptographically hashed values, block 180, and replicates the database 104 of hashed values, block 190. The replicated hashed values are stored in a database 106, block 200. The hashed values stored in the secure processor 102 are now provisioned and ready for use in a method for secure database queries.

The secure database management processor 101, can operate within a trusted environment such as a SCIF as described above, so that the cleartext data remains safeguarded. In an embodiment, the secure processor 102 can be located at a remote, untrusted location, wherein the encrypted tunnel 105, is used to transfer the hashed database values to the remote secure processor 102. In an alternative embodiment, secure processor 102, secure database management processor 101 or any other secure processor, may perform method 100 in a collocated configuration within a trusted environment, obviating the need for encrypted tunnel 105. In other words, the database of hashed values 106, can be provisioned directly within the secure processor 102 while in a trusted environment and then operate remotely when separated from the trusted environment. In such an embodiment, there would be no need to transmit 170 the encrypted hashed values to the secure processor or to replicate 190 the database of hashed values.

Figure 2:
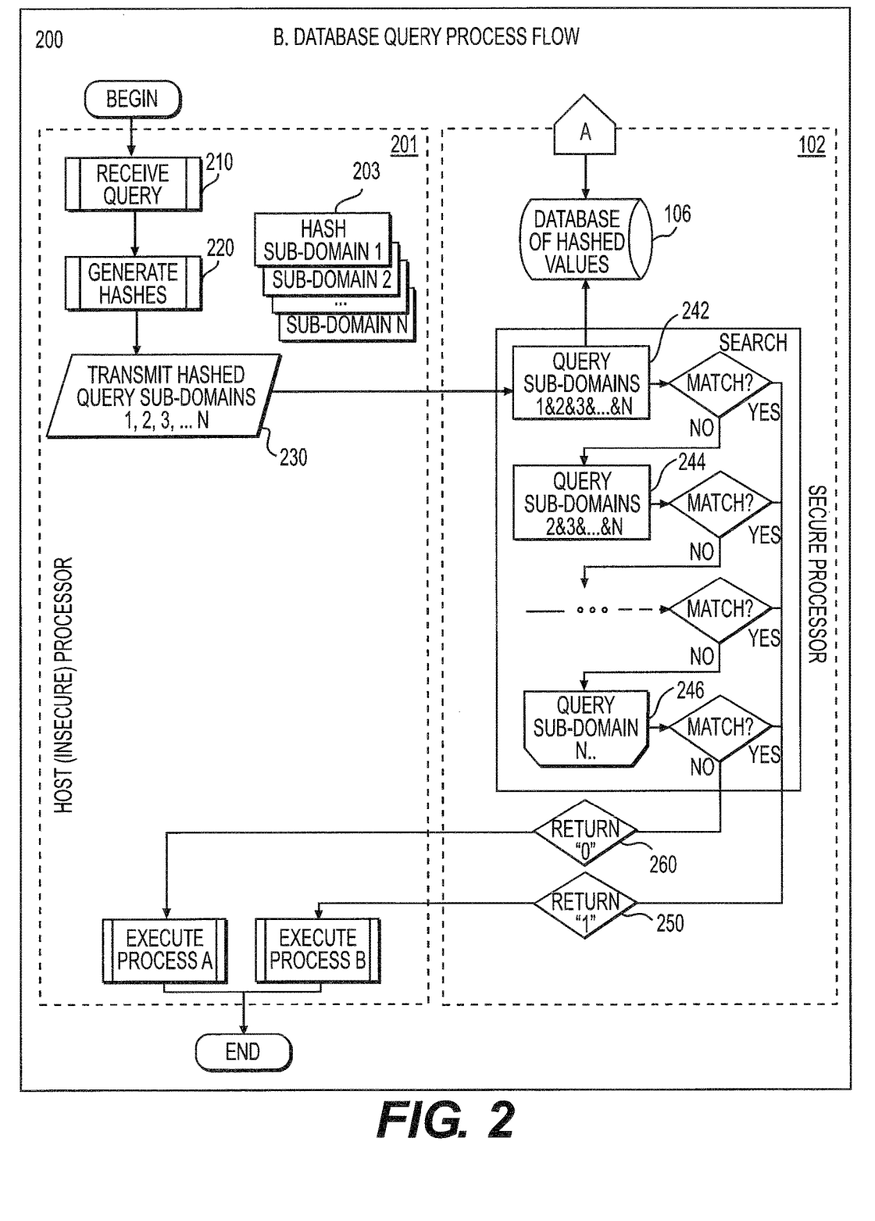
FIG. 2 is a flow diagram that illustrates an embodiment of a process for secure database queries.

With reference now to FIG. 2, shown is an embodiment of a method 200 for secure database query process flow. In an embodiment, a non-secure network connected system, e.g., including host (non-secure) processor 201, receives a query, block 210 and generates hashes, block 220 from the query data it wishes to verify against the protected database on the secure processor 102. In an exemplary implementation, the query data may include a domain name(s) (URL), IP address(es), terrorist or suspected terrorist names, credit card numbers, passport numbers, driver's license numbers, license plate data, phone numbers, bank accounts, other identification data, etc. In a further aspect of the invention, additional hashes are computed for variations of the original query data such that a set of associated hashes 203 are generated 220 and searched. If for example, an IP address query is desired, the original IP hash can be generated along with a set of additional hashes that would relate to the original IP address query and its associations. The additional hashes could include various representations of the original IP addresses such as IP sub-domains or alternative representations of a domain name. IP address hashes may be iterated through the various sub-domains that are possible, for example, the hash for 192.168.1.2 will be computed and in addition, hashes will be computed for "192.168.1.2", "192.168.1.0", "192.168.0.0", and "192.0.0.0". Similarly, domain names may be hashed via all possible sub-domains, for example, www.xyz.com will be hashed as: "www.xyz.com", "www.xyz.com.", "xyz.com", "xyz.com.".

After generating 220 the hashes 203, the non-secure network connected processor 201 may then query a hash compare engine on the secure processor 102 with the hashed data 203 (e.g., hashed domain names or IP addresses), block 230. The processor 201 may query the secure processor 102 by transmitting 230 the combined hashed data 203 to the secure processor 102 over a non-secure transmission. The secure processor 102 searches through the hashes stored in a database 106 on the secure processor 102, block 240, and returns 'true' on a hash collision of any iteration of the hashed domain or IP address, block 250, or returns 'false' to the non-secure network connected processor if no version of the hashed domain name or IP address is found in the database, block 260, as described in more detail below. The objective of performing searches on the sub-domains or associations of the hashed indicators is to provide a capability analogous to "wild card" searches.

In an embodiment, hashes are in the format of SHA-2 and are 256 bits long and each of the various sub-domains results in separate 256 bit hash values. The hash compare engine performs a hash compare and returns a comparison result (true or false); in an embodiment, the hash compare operation is efficiently implemented by using a simple bit-by-bit XOR and shifting operation that compares the hashed query values 203 to the database 106 of hashed values. The hash compare operation begins by XOR'ing the least-significant bit ("LSB") of the hashed query value with the LSB of the database value and then continues through to the most-significant bit ("MSB"), producing a bit string as a result. If the resulting bit string is a sequence of 0's, this indicates that there is a 'match' between the hash value in the query and a hash value in the reference database 106 on the secure processor 102, which outputs 250 an integer '1' as a result. If the bit string contains any 1's, then this indicates that there is 'no match' and the secure processor 102 outputs 260 an integer '0' result. The final result is returned to the non-secure network connected processor 201. Processor 201 may execute a various processes based on the returned value. For example, if secure processor 102 returns a 0 indicating no match, non-secure processor may execute a process A, block 270. Process A may be to indicate the clearance of a IP address, domain name or passenger (e.g., as not on a terrorist list). On the other hand, if secure processor returns a 1 indicating a match, non-secure processor may execute a process B, block 280. Process B may be to indicate the rejection or non-clearance of a IP address, domain name or passenger (e.g., as being on a terrorist list). The results may be exposed externally by the non-secure network connected processor 201 and such exposure does not reveal the comparison operations, the confidential contents of the secure, cryptographically hashed database 102 or the original clear text values 103.

In a further refinement, the most specific version of the hashed data (e.g., domain or IP address) will be found. With continuing reference to FIG. 2, a set of hashed sub-domains are compared hierarchically wherein all of the query hashes in the set of associated hashes 203 (as described above) are compared against the hashed value database 106, block 242. If all of the query hashes 203 are all present in the database 106, an output value of '1' is returned 250, indicating that a match occurs for all of the hashed values in the set of hashed sub-domains. If any one of the query hashes 203 does not match a hash in the database 106, then a second iteration of comparison occurs by removing a non-matching query hash (e.g., sub-domain) from the search and comparing the reduced set of query hashes to the hashed value database 106, block 244. If the comparison 240 continues to return a non-match, then the process of removing a non-matching query hash (e.g., sub-domain) and comparing the reduced set is repeated until a final hashed value (e.g., sub-domain) remains, block 246. If no match occurs, the process ends and a '0' is returned 260, indicating that no match has occurred in any of the hashed data 203 (e.g., sub-domains)

In an alternative embodiment with reference to FIG. 2, one processor, e.g., a combined secure processor 102 and host non-secure processor 201, may perform method 200. In such an embodiment, transmitting 230 the combined hashed data 203 to the secure processor 102, block 240, over a non-secure transmission is performed internally within the one processor, e.g., secure processor 102. Additionally, the combined processor would receive 210 the query (e.g., the cleartext input) and generate 220 the hashes from the query data.

Figure 3:
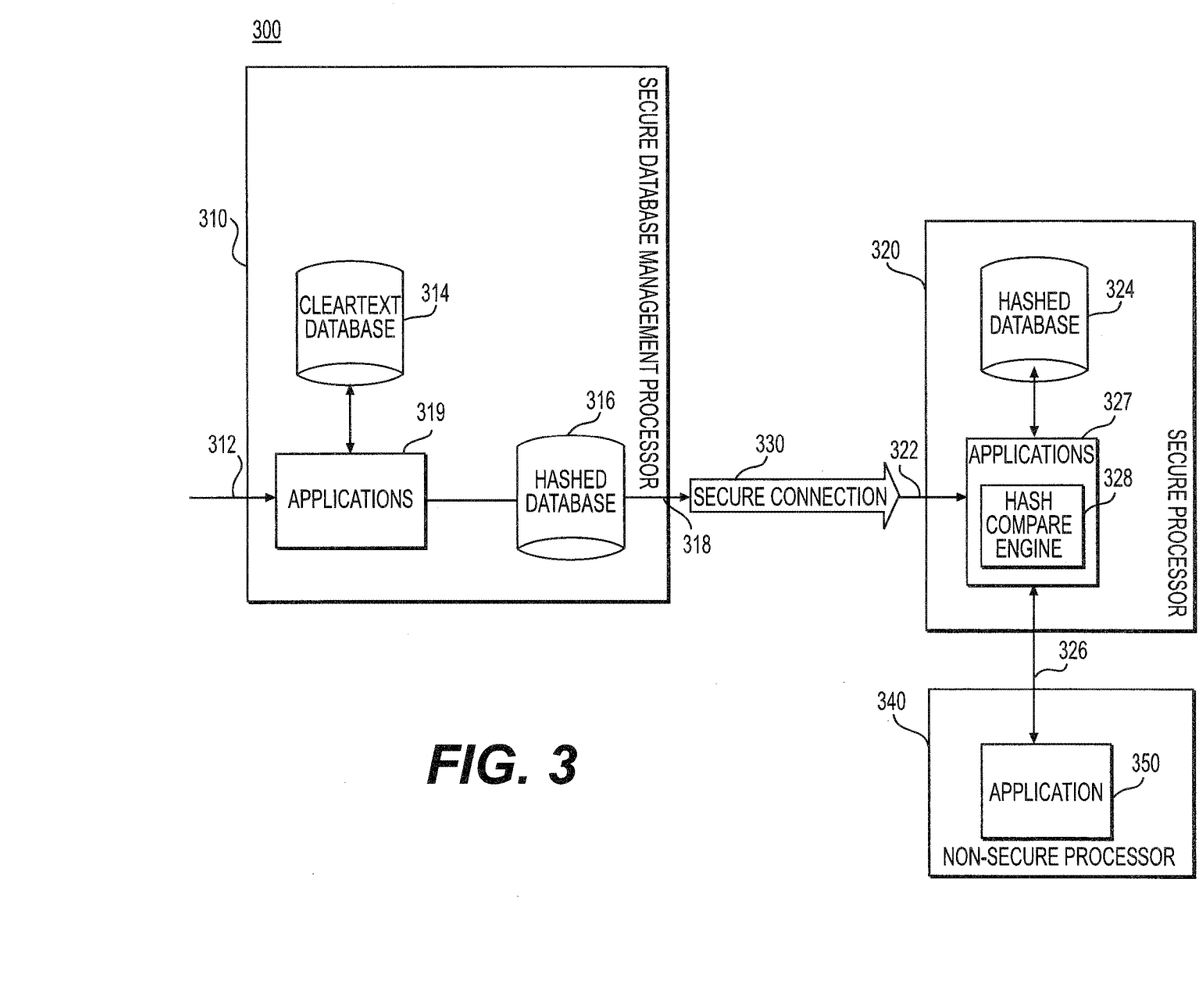
FIG. 3 is a block diagram that illustrates an embodiment of a system for secure database queries.

With reference now to FIG. 3, shown is a block diagram of an embodiment of a system 300 for secure database queries. The embodiment of system 300 shown includes a secure database management processor 310 (e.g., secure database management processor 101 in FIG. 1) and secure processor 320 (e.g., secure processor 102 in FIG. 1). Secure database management processor 310 may be co-located with and, e.g., on same network or bus as secure processor 320. Alternatively, secure database management processor 310 may be separate or even remotely located from secure processor 320. In such implementation, secure database management processor 310 may be connected to secure processor 320 through a secure connection, such as encrypted VPN tunnel 330.

Secure database management processor 310 may include an input 312, a database of cleartext or plaintext value 314, a database of cryptographically hashed values 316 and an output 318. Secure database management processor 310 also includes or is programmed with instructions (e.g., a software application(s)) necessary to receive cleartext/plaintext values, cryptographically hash cleartext/plaintext values, encrypt hashed data, and transmit encrypted data. Secure processor 320 may include input 322, database of hashed values 324, and output 326. Secure processor 320 also includes or is programmed with instructions (e.g., a software application(s) 327) necessary to receive encrypted hashed values, decrypt the encrypted hash values, replicate the database of hashed values, receive a query of hashed values, query the replicated database of hashed values with the received query, determine whether a match is present and output a value(s) indicating whether a match was found or not. The instructions for receiving a query of hashed values, querying the replicated database of hashed values with the received query, determining whether a match is present and outputting a value(s) indicating whether a match was found or not may be implemented as the hash compare engine 328 described above.

With continued reference to FIG. 3, system 300 may also include an application 350 that can be installed on non-secure processor 340 (e.g., host (non-secure) processor 201) in order for non-secure processor 340 to query hash compare engine 328 in secure processor 320 as described above. Application 350 may enable non-secure processor 340 to hash a received query and variations of the received query in order to form query hashes 203.

As noted above with reference to FIG. 1, the operations of secure database management processor 310 and secure processor 320 may be performed in a collocated manner. Consequently, the features of secure database management processor 310 and secure processor 320 may be present in a collocated configuration, obviating the need for a secure connection.

Additionally, in another embodiment, as described above with regards to FIG. 3, secure processor 320 and host non-secure processor 340, may be combined. In such an embodiment, the transmission of the hashed query to the secure processor 320 is performed internally within the one combined processor. Additionally, the combined processor receive the query (e.g., the cleartext input) and generate the hashes from the query data.

Figure 4:
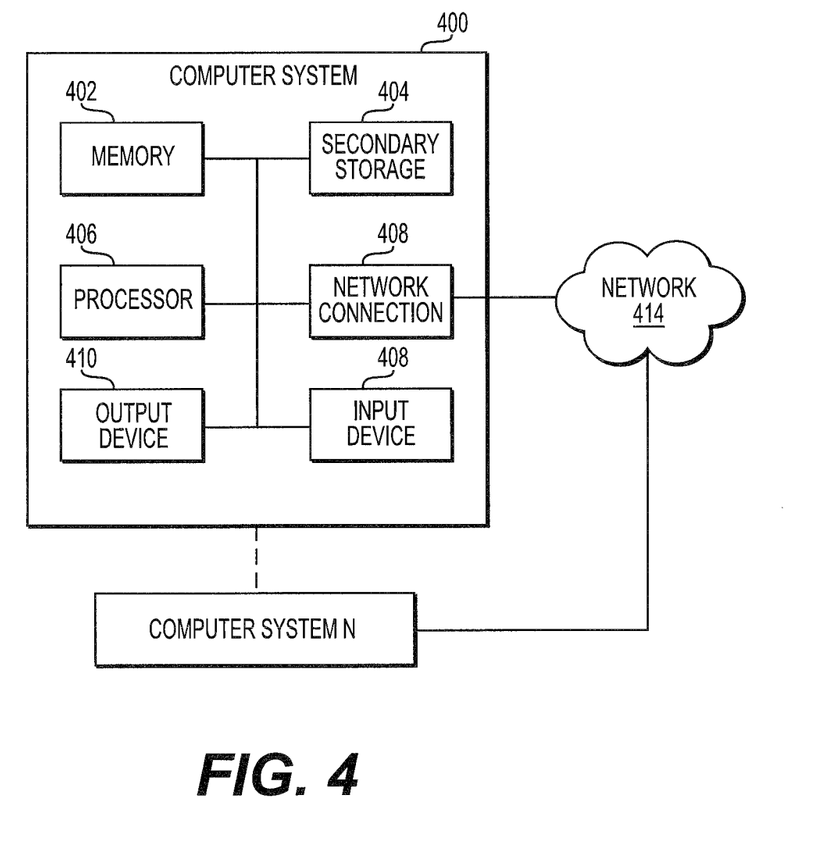
FIG. 4 is a block diagram that illustrates exemplary hardware components of an embodiment of a system for secure database queries.

With reference now to FIG. 4, shown is a block diagram illustrating exemplary hardware components for implementing embodiments of system 300 and methods 100, 200 for secure database queries. Computer system 400 may include and execute one or more software applications to perform functions described herein, including steps of methods 100, 200 described above. Computer system 400 may connect with network 414, e.g., Internet, or other network, to receive inquires, obtain data, and transmit information as described above. Computer system 400 may be implemented as a secure processor (e.g., secure processor 320).

Computer system 400 typically includes a memory 402, a secondary storage device 404, and a processor 406. Computer system 400 may also include a plurality of processors 406 and be configured as a plurality of, e.g., blade servers, or other known server configurations. Computer system 400 may also include an input device 408 and an output device 410. Memory 402 may include RAM or similar types of memory, and it may store one or more applications for execution by processor 406. Secondary storage device 404 may include a hard disk drive or other types of non-volatile data storage. Processor 406 executes the application(s) which are stored in memory 402 or secondary storage 404, or received from the Internet or other network 414. The processing by processor 406 may be implemented in software, such as software modules, for execution by computers or other machines. Alternatively, all or parts of computer system 400 may be implemented in hardware processing devices or a combination of hardware, software and firmware, such as Application Specific Integrated Circuits (ASICs), Field Programmable Gate Arrays (FPGAs), embedded processors or other means that are well known to those skilled in the art of digital processing and computing implementation. These applications preferably include instructions executable to perform the functions and methods described above and illustrated in the FIGS. herein. The applications preferably provide graphical user interfaces (GUIs) through which users may view and interact with system.

Computer system 400 may store one or more database structures in secondary storage 404, for example, for storing and maintaining databases described above, and other information necessary to perform the above-described methods.

Also, as noted, processor 406 may execute one or more software applications in order to provide the functions described in this specification, specifically to execute and perform the steps and functions in the methods described above. Such methods and the processing may be implemented in software, such as software modules, for execution by computers or other machines.

Although computer system 400 is depicted with various components, one skilled in the art will appreciate that the server can contain additional or different components. In addition, although aspects of an implementation consistent with the above are described as being stored in memory, one skilled in the art will appreciate that these aspects can also be stored on or read from other types of computer program products or computer-readable media. The computer-readable media may include instructions for controlling a computer system, computer system 400, to perform a particular method, such as methods described above.

The advantages of the embodiments described herein include but are not limited to:
IMPROVED CONFIDENTIALITY: Increased protection for sensitive data through application of multiple layers of cryptographic algorithms to increase an adversary's required work effort needed to compromise the data using a brute force attack such that it cannot be accomplished in polynomial time
IMPROVED EFFICIENCY: Reduced processor load and improved execution speed resulting from performing matching operations on hash digests which can be significantly smaller than the clear text data they represent.
IMPROVED DATA STORAGE UTILIZATION: Reduced storage requirements for populating the database resulting from storing hash digests which can be significantly smaller than the clear text data they represent
IMPROVED DATA TRANSMISSION BANDWIDTH UTILIZATION: Reduced transmission bandwidth requirements for replicating the database resulting from data compression achieved by transmitting hash digests which can be significantly smaller than the clear text data they represent The following describes an example of how embodiments of the system and method may be used with a terrorist, "no fly" or banned substance watch list. A watch list may be entered into a database as clear or plain text data. The terrorist watch list will typically include names and pseudonyms of subjects on the watch list. The clear text data values of the watch list may be cryptographically hashed by secure database management processor using known hashing algorithms. The cryptographically hashed values may be encrypted and transmitted via an encrypted VPN tunnel to a secure processor. The secure processor decrypts the data and replicates the database of cryptographically hashed terrorist watch list data. Suspicious subjects identified, attempting to obtain visas, traveling across borders, importing banned goods, etc., need to be searched against watch lists to determine if they are a threat. Consequently, a non-secure network connected processor may receive a subject name for searching. The non-secure network connected processor may automatically conduct the search or per a user's instructions. The non-secure network connected processor may hash the subject name and various variants of the subject name. After hashing the name and its variants, the non-secure network connected processor may submit a query with the hashed data to a secure processor. The secure processor hash compare engine searches the query of hashed data against the database of cryptographically hashed watch list data. If there is a match, the secure processor makes data available indicating the match (or lack of match) to the non-secure network connected processor.

What is claimed is:

1. A method of performing secure computations on a protected database comprising:
   providing, in a secure processor, a database of cryptographically hashed values based on a database of cleartext values;
   a non-secure processor:
      receiving a cleartext query;
      producing variations of the cleartext query by iteratively stripping off or substituting characters or substrings at the end of the cleartext query string based on the data type; and
      hashing the cleartext query and the variations of the cleartext query to form a plurality of cryptographically hashed query values;
   receiving the plurality of cryptographically hashed query values as input into the secure processor wherein the query values are a hash of a cleartext value that corresponds to a cleartext query and the variations of the cleartext query;
   performing a comparison operation within the secure processor to determine the presence of any of the hashed query values within the database of cryptographically hashed values, wherein the performing a comparison operation includes:
   (a) XOR'ing a least-significant bit ("LSB") of one of the hashed query values with a LSB of a cryptographically hashed value from the database of cryptographically hashed values;
   (b) XOR'ing a next LSB of one of the hashed query values with a next LSB of the cryptographically hashed value;
   (c) repeating the XOR'ing of the next LSB of one of the hashed query values with the next LSB of the cryptographically hashed value through a most-significant bit (MSB) of the hashed query value and the MSB of the cryptographically hashed value; and
   (d) producing a bit string of the XOR'ed bits, wherein a bit string that is a sequence of 0's indicates a match between one of the hashed query values and the cryptographically hashed value; and
   providing the results of the comparison operation to an external interface of the secure processor, wherein the contents of the database of cryptographically hashed values and the comparison operation are encapsulated within the secure processor and unexposed externally therefrom.

2. The method of claim 1 wherein the performing a comparison operation further includes repeating (a)-(d) for each cryptographically hashed value in the database of cryptographically hashed values.

3. The method of claim 2 wherein the repeating (a)-(d) repeats (a)-(d) until a match between the at least one of the hashed query values and the cryptographically hashed value is found.

4. The method of claim 1 wherein the performing a comparison operation further includes outputting an integer 1 if a match between at least one of the hashed query values and the cryptographically hashed value is found.

5. The method of claim 1 wherein the performing a comparison operation further includes outputting a "true" if a match between at least one of the hashed query values and the cryptographically hashed value is found.

6. The method of claim 2 wherein the performing a comparison operation further includes outputting a "false" if no match between any of the hashed query values and the cryptographically hashed values is found.

7. The method of claim 1 wherein the non-secure processor produces the cryptographically hashed query value by transforming the cleartext query to a hashed value.

8. The method of claim 1 wherein the data type includes URLs and IP addresses and producing the variations of the cleartext query includes stripping the leftmost character from URL cleartext query strings and stripping or substituting the rightmost character(s) from IP address cleartext query strings.

9. A non-transitory computer readable medium comprising instructions for performing secure computations on a protected database, by:
   providing, in a secure processor, a database of cryptographically hashed values based on a database of cleartext values;
   a non-secure processor:
      receiving a cleartext query;
      producing variations of the cleartext query by iteratively stripping off or substituting characters or substrings at the end of the cleartext query string based on the data type; and
      hashing the cleartext query and the variations of the cleartext query to form a plurality of cryptographically hashed query values;
   receiving the plurality of cryptographically hashed query values as input into the secure processor wherein the query values are a hash of a cleartext value that corresponds to a cleartext query and the variations of the cleartext query;
   performing a comparison operation within the secure processor to determine the presence of any of the hashed query values within the database of cryptographically hashed values, wherein the performing a comparison operation includes:

(a) XOR'ing a least-significant bit ("LSB") of one of the hashed query values with a LSB of a cryptographically hashed value from the database of cryptographically hashed values;

(b) XOR'ing a next LSB of one of the hashed query values with a next LSB of the cryptographically hashed value;

(c) repeating the XOR'ing of the next LSB of one of the hashed query values with the next LSB of the cryptographically hashed value through a most-significant bit (MSB) of the hashed query value and the MSB of the cryptographically hashed value; and d) producing a bit string of the XOR'ed bits, wherein a bit string that is a sequence of 0's indicates a match between one of the hashed query values and the cryptographically hashed value; and providing the results of the comparison operation to an external interface of the secure processor, wherein the contents of the database of cryptographically hashed values and the comparison operation are encapsulated within the secure processor and unexposed externally therefrom.

10. The computer readable medium of claim 9 in which the performing a comparison operation further includes repeating (a)-(d) for each cryptographically hashed value in the database of cryptographically hashed values.

11. The computer readable medium of claim 10 wherein the repeating (a)-(d) repeats (a)-(d) until a match between at least one of the hashed query values and the cryptographically hashed value is found.

12. The computer readable medium of claim 10 in which the performing a comparison operation further includes outputting an integer 1 if a match between at least one of the hashed query values and the cryptographically hashed value is found.

13. The computer readable medium of claim 10 in which the performing a comparison operation further includes outputting a "true" if a match between at least one of the hashed query values and the cryptographically hashed value is found.

14. The computer readable medium of claim 10 in which the performing a comparison operation further includes outputting a "false" if no match any of the hashed query values and the cryptographically hashed values is found.

15. The computer readable medium of claim 10 wherein the data type includes URLs and IP addresses and producing the variations of the cleartext query includes stripping the leftmost character from URL cleartext query strings and stripping or substituting the rightmost character(s) from IP address cleartext query strings.

16. A method of performing secure computations on a protected database comprising:

providing, in a secure processor, a database of cryptographically hashed values based on a database of cleartext values;

receiving a cleartext query of the database of cryptographically hashed values;

producing variations of the cleartext query by iteratively stripping off or substituting characters or substrings at the end of the cleartext query string based on the data type;

hashing the cleartext query and the variations of the cleartext query to form a plurality of cryptographically hashed query values;

cryptographically hashing the cleartext query and the variations of the cleartext query to create a plurality of cryptographically hashed query values;

performing a comparison operation within the secure processor to determine the presence of any of the hashed query values within the database of cryptographically hashed values, wherein the performing a comparison operation includes:

(a) XOR'ing a least-significant bit ("LSB") of one of the hashed query values with a LSB of a cryptographically hashed value from the database of cryptographically hashed values;

(b) XOR'ing a next LSB of one of the hashed query values with a next LSB of the cryptographically hashed value;

(c) repeating the XOR'ing of the next LSB of one of the hashed query values with the next LSB of the cryptographically hashed value through a most-significant bit (MSB) of the hashed query value and the MSB of the cryptographically hashed value; and d) producing a bit string of the XOR'ed bits, wherein a bit string that is a sequence of 0's indicates a match between one of the hashed query values and the cryptographically hashed value; and providing the results of the comparison operation to an external interface of the secure processor, wherein the contents of the database of cryptographically hashed values and the comparison operation are encapsulated within the secure processor and unexposed externally therefrom.

* * * * *